(12) United States Patent
Yoshikawa

(10) Patent No.: US 6,666,792 B2
(45) Date of Patent: Dec. 23, 2003

(54) TOROIDAL CONTINUOUSLY VARIABLE TRANSMISSION

(75) Inventor: Tomonobu Yoshikawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/223,334

(22) Filed: Aug. 16, 2002

(65) Prior Publication Data

US 2003/0087723 A1 May 8, 2003

Related U.S. Application Data

(63) Continuation of application No. PCT/JP01/11245, filed on Dec. 21, 2001.

(30) Foreign Application Priority Data

Dec. 27, 2000 (JP) ........................................ 2000-398708

(51) Int. Cl.⁷ ................................................ F16H 15/38
(52) U.S. Cl. ........................... 476/73; 476/40; 148/319
(58) Field of Search ............................ 476/40, 42, 46, 476/72, 73; 148/319

(56) References Cited

U.S. PATENT DOCUMENTS 5,556,348 A  9/1996  Kokubu et al.
6,051,080 A  4/2000  Kino et al.

FOREIGN PATENT DOCUMENTS

| JP | 60021362 | 2/1985 |
|---|---|---|
| JP | 2-49411 A | 12/1990 |
| JP | 04021757 | 1/1992 |
| JP | 06306572 | 11/1994 |
| JP | 07316640 | 12/1995 |
| JP | 9-79336 A | 3/1997 |
| JP | 9-79339 A | 3/1997 |
| JP | 09079338 | 3/1997 |
| JP | 11-141638 A | 5/1999 |
| JP | 11-199983 A | 7/1999 |

OTHER PUBLICATIONS

Coy, J.J., et al., "Fatigue Life Analysis for Traction Drives With Application to a Toroidal Type Geometry," *NASA Technical Note*, NASA TN D–8362, Dec. 1976.

"Method of Austenite Grain Size Test for Steel," JIS G0551, 1977.

"Methods of Measuring Case Depth Hardened by Carburizing Treatment for Steel," JIS G0557, 1996.

*Primary Examiner*—William C Joyce
(74) *Attorney, Agent, or Firm*—Christensen O'Connor Johnson Kindness PLLC

(57) ABSTRACT

A toroidal continuously variable transmission is characterized by comprising an input disk, an output disk, trunnions, power rollers, and thrust rolling-element bearing, in which at least one of the input disk, output disk and power rollers of a power roller bearing is formed of an alloy steel and subjected to either carburizing processing and polishing or carbonitriding processing and polishing, and at least one of the input disk, output disk and the inner ring of the power roller bearing has an efficient hardened layer of Hv 653, which has a depth of 2.0 mm or more and 4.00 mm or less from the surface.

3 Claims, 4 Drawing Sheets

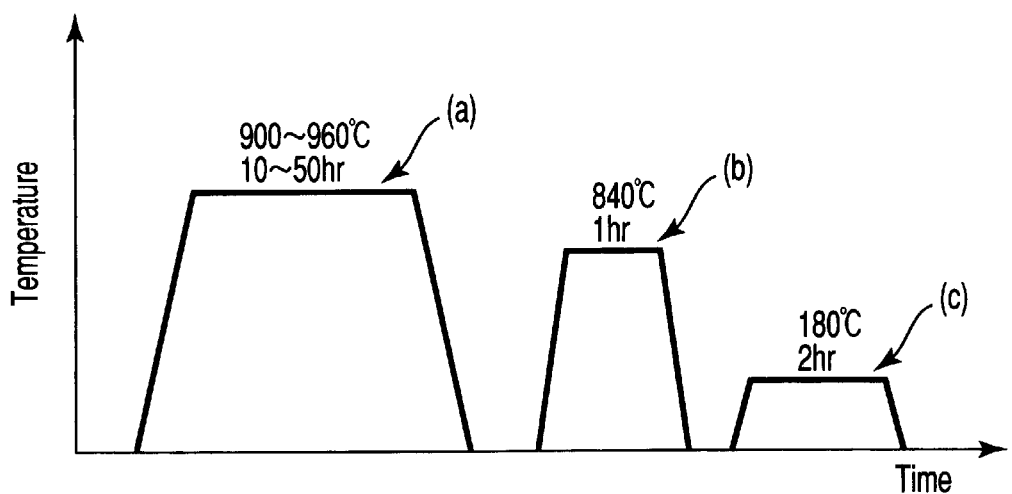
F I G. 2
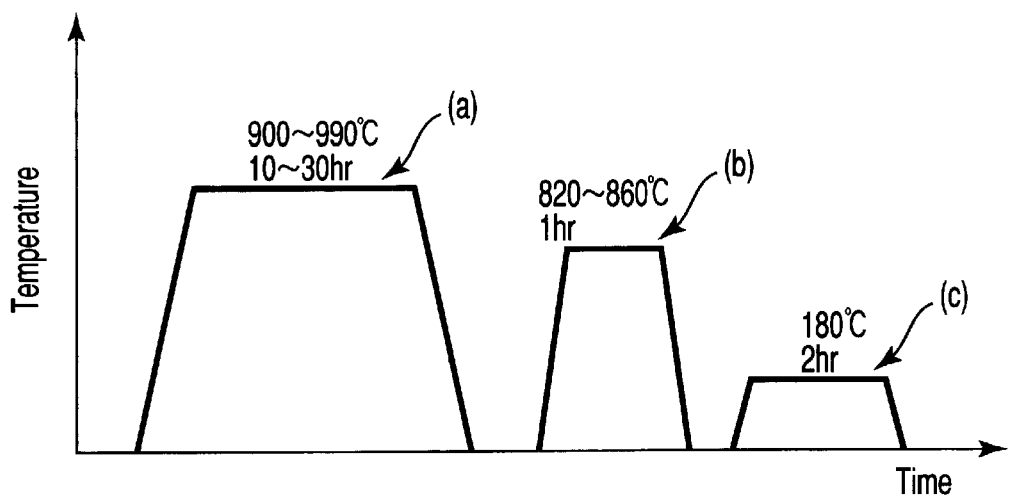
F I G. 3

TOROIDAL CONTINUOUSLY VARIABLE TRANSMISSION

CROSS-REFERENCE TO RELATED APPLICATIONS

This is a Continuation Application of PCT Application No. PCT/JP01/11245, filed Dec. 21, 2001, which was not published under PCT Article 21(2) in English.

This application is based upon and claims the benefit of priority from the prior Japanese Patent Application No. 2000-398708, filed Dec. 27, 2000, the entire contents of which are incorporated herein by reference.

BACKGROUND OF THE INVENTION

1. Field of the Invention

The present invention relates to a toroidal continuously variable transmission, and more specifically, to a toroidal continuously variable transmission designed for use in vehicles such as automobiles.

2. Description of the Related Art

As a toroidal continuously variable transmission 20, the one shown in FIG. 1 has been known.

Inside a housing (not shown), an input disk 1 and an output disk 2 are coaxially arranged so as to face each other. An input shaft 3 extends through the axis of the toroidal transmission including the input and output disks 1 and 2. A loading cam 4 is disposed at one end of the input shaft 3. The loading cam 4 is configured to transmit the driving force (torque) of the input shaft 3 to the input disk 1 through a cam roller 5.

The input and output disks 1 and 2 have a substantially similar shape and are arranged symmetric. The surfaces of these disks facing each other are toroidal surfaces jointly forming a substantial semicircle sectional view taken axially. A pair of power roller bearings 6 and 7 for transmitting power are arranged in toroidal cavities defined by the toroidal surfaces of the input and output disks 1 and 2, in such a way that the bearings 6 and 7 be in contact with the input and output disks 1 and 2.

The power roller bearing 6 includes a power roller 6a which rolls on the toroidal surfaces of the input and output disks 1 and 2 (and which corresponds to an inner ring of the power roller bearing 6), an outer ring 6b and a plurality of rolling members (steel balls) 6c. The other power roller bearing 7 is composed of a power roller 7a which rolls on the toroidal surfaces of the input and output disks 1 and 2 (and which corresponds to an inner ring of the power roller bearing 7), an outer ring 7b and a plurality of rolling members (steel balls) 7c.

In other words, the power roller 6a also functions as the inner ring, which is a structural component of the power roller bearing 6, and the power roller 7a also functions as the inner ring, which is a structural component of the power roller bearing 7. In this structure, the power roller 6a is rotatably coupled to a trunnion 10 by means of a pivot 8, the outer ring 6b and the rolling members 6c, and at the same time obliquely supported around a pivot axis O, which is the center of the toroidal surfaces of the input and output disks 1 and 2.

Likewise, the power roller 7a is rotatably coupled to a trunnion 11 by means of a pivot 9, the outer ring 7b and rolling members (steel balls) 7c, and at the same time obliquely supported by a pivot axis O, which is the center of the toroidal surfaces of the input and output disks 1 and 2. A lubricant having a large viscosity or friction resistance is supplied onto the contact surfaces of the input disk, output disk 1, 2 and the power rollers 6a, 7a. A driving force is exerted on the input disk 1 and transmitted to the output disk 2 through a lubricant film and the power rollers 6a and 7a.

The input and output disks 1 and 2 are independent of the input shaft 3 with a needle 12 interposed between them (that is, the input disk 1 and output disk 2 are not directly affected by the movement of the rotating shaft 3). The output shaft 14, which is arranged in parallel to the input shaft 3 and rotatably supported by a housing (not shown) via angular members 13, is connected to the output disk 2.

In the toroidal continuously variable transmission 20, the driving force of the input shaft 3 is transmitted to the loading cam 4. When the driving force is transmitted and rotates the loading cam 4, the rotation force is transmitted to the input disk 1 through the cam roller 5, thereby rotating the input disk 1. The power generated by the rotation of the input disk 1 is transmitted to the output disk 2 by way of the power roller 6a and the power roller 7a. As a result, the output disk 2 rotates together with the output shaft 14.

At the time of transmission, the trunnions 10 and 11 are moved a little toward the pivot axes O. When the trunnions 10 and 11 are moved toward the axes, the intersection between the axis of rotation of the power rollers 6a and 7a and the axis of the input and output disks 1 and 2 is shifted slightly from the original position. As a result, the circumferential velocity of the rotation of each of the power rollers 6a and 7a and that of the rotation of the input disk 1 become off balance, and the component force of the torque of the input disk 1 makes the power rollers 6a and 7a to rotate obliquely around the pivot axes O. As a result, the power rollers 6a and 7a obliquely moves on the curved surfaces of the input and output disks 1 and 2.

Since the power rollers 6a and 7a are obliquely rotated on the curved surfaces of the input and output disks 1 and 2, a velocity ratio changes, with the result that deceleration and acceleration are performed. An example of a conventional toroidal continuously variable transmission having such a structure is shown in Jpn. UM. Appln. Publication No. 2-49411.

As the input disk, output disk and power roller bearing, those formed of AISI52100 (JIS SUJ2 corresponding to high carbon chromium steel) are conventionally known as described in "NASA Technical note NASA ATN D-8362".

The present inventors have filed an invention (Jpn. Pat. Appln. KOKAI Publication No. 7-71555) in which the input disk, output disk and the power roller bearing are subjected to surface treatment such as carburization or carbonitriding processing to improve a resistant life. Alternatively, the surface treatment is limited to carbonitriding in Jpn. Pat. Appln. KOKAI Publication No. 9-79336, in which the nitrization amount and residual austenite are defined.

In the toroidal continuously variable transmission, the input disk, output disk, power roller, and loading cam repeatedly receive an extremely large bending stress and shearing stress as compared to machine parts such as a gear, which generally receives stress repeatedly. For this reason, it has been proposed that these disks, power roller, and cam disk should be formed of a material having a high fatigue strength and treated with heat to improve the fatigue strength.

For example, in Jpn. Pat. Appln. KOKAI Publication No. 7-71555, the input disk, output disk, power roller and power roller are formed so as to have a hardened layer whose effective depth is 2.0 mm or more and 4.0 mm or less. In Jpn. Pat. Appln. KOKAI Publication No. 7-286649, shot peening is performed after the heat treatment. In Jpn. Pat. Appln. KOKAI Publication No. 11-141638, assuming that dynamic maximum shearing stress is generated at a position $Z_0$, the hardness of the hardened layer at a position satisfying 3.0 $Z_0$ to 5.0$Z_0$ is set at 650 or more.

However, recently, it has been demanded that the toroidal continuously variable transmission should be further miniaturized and the output of transmission torque be further increased. Therefore, mechanical parts are required to have higher fatigue strength than conventional ones.

BRIEF SUMMARY OF THE INVENTION

The present invention has been attained to overcome the aforementioned problems. The present invention is to provide a toroidal continuously variable transmission having a long life and capable of suppressing the peeling-off of the traction surface of the toroidal surface formed of an input disk and an output disk and of the traction surface of a power roller and simultaneously improving the lives against fatigue cracking of the input disk, output disk, and power roller by constructing the toroidal continuously variable transmission such that at least one of the input disk, output disk, and the inner ring of the power roller bearing is formed of an alloy steel and subjected to either carburizing polishing and polishing or carbonitriding processing and polishing, and at least one of the input disk, the output disk, the inner ring of the power roller bearing has a hardened layer of Hv 653 having a depth 2.0 mm or more and 4.0 mm or less from the surface.

To attain the aforementioned object, the toroidal continuously variable transmission comprising an input disk attached to an input shaft, an output disk attached to an output shaft, and a power roller bearing including an inner ring, an outer ring, and a plurality of rolling elements, the inner ring engaging with the input and output disks to transmit power from the input shaft to the output shaft, characterized in that at least one of the input disk, output disk, and an inner ring of a power roller bearing is formed of an alloy steel and subjected to either carburizing processing and grinding or carbonitriding processing and grinding and at least one of the input disk, output disk and inner ring of the power roller bearing has an effective hardened layer of Hv 653 having a depth of 2.00 mm or more and 4.00 mm or less from the surface.

A toroidal continuously variable transmission according to claim 2, characterized in that a grain size in the surface is 8 or more and a grain size in the core is 4 or more.

A toroidal continuously variable transmission according to claim 3, characterized in that the alloy steel contains 0.010 to 0.050% of Al and 0.005 to 0.030% of N.

A toroidal continuously variable transmission according to claim 4, characterized in that the alloy steel contains 0.015 to 0.035% of Al and 0.005 to 0.020% of N.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a characteristic graph showing the relationship between time and temperature when heat treatment is applied to structural components, namely an input disk, output disk, and power rollers of the toroidal continuously variable transmission of the present invention;

FIG. 3 is a characteristic graph showing the relationship between time and temperature when heat treatment is applied to structural components, namely an input disk, output disk, and power rollers of the toroidal continuously variable transmission of the present invention;

DETAILED DESCRIPTION OF THE INVENTION

Figure 1:
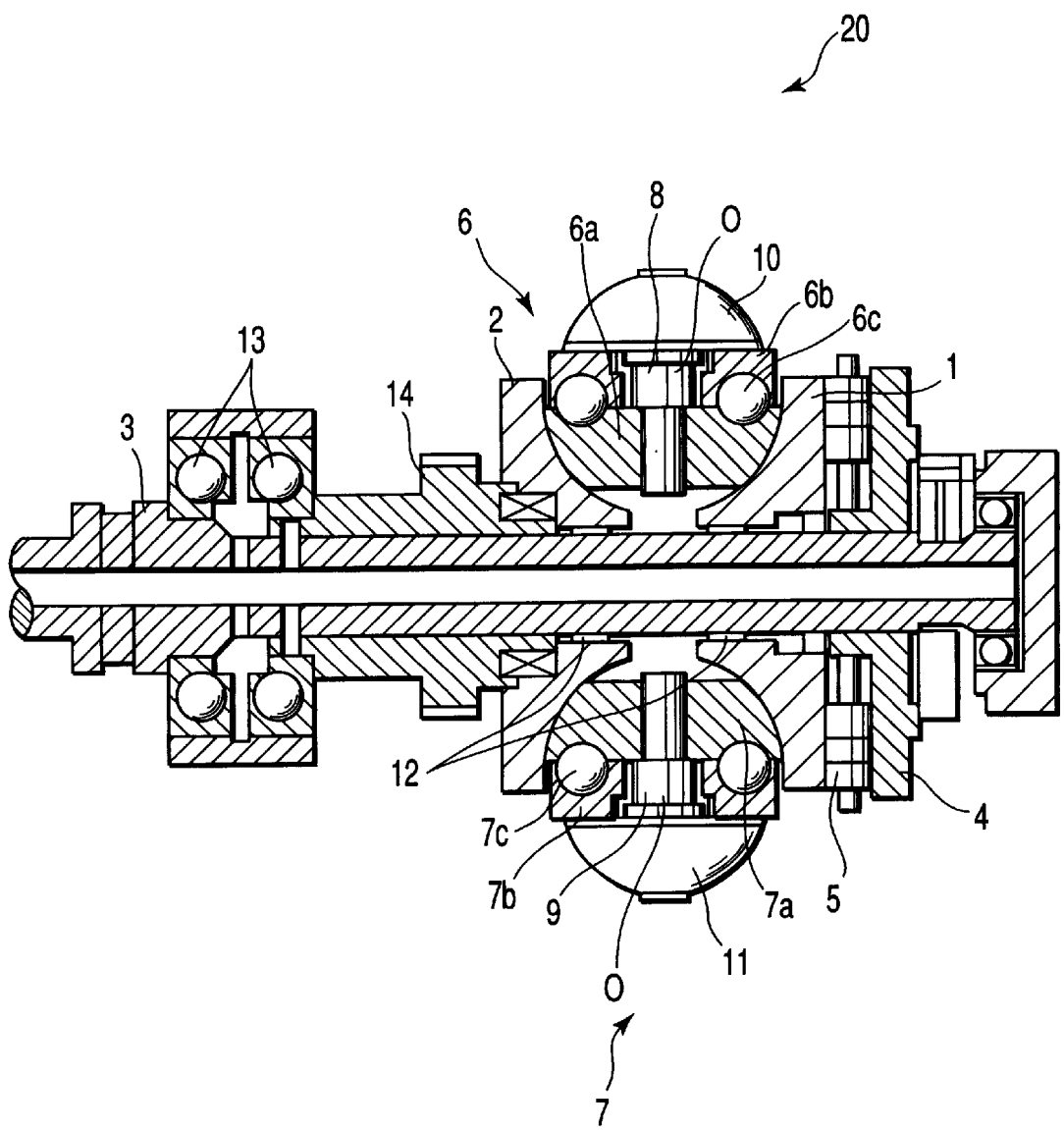
FIG. 1 is an explanatory view of a toroidal continuously variable transmission continuously variable transmission.

Now, the toroidal continuously variable transmission of the present invention will be explained in more detail.

The term "the effective depth of the hardened layer" is not the one defined by JIS G0557 but the depth of a hardened layer having a Vickers' hardness of 653 or more from the surface of the hardened layer.

The input disk, output disk and power rollers, which are the structural components of the toroidal continuously variable transmission of the present invention, are formed of an alloy steel and subjected to surface treatment, such as carburization processing and polishing or carbonitriding processing and polishing. Furthermore, the effective depth of the hardened layer, (i.e., the depth from the surface of the hardened layer of Hv 653 or more) of at least one of both disks and power rollers is set at 2.0 mm or more and 4.0 mm or less. As a result, the traction surface of the troidal surface formed of the input and output disks and the traction surface of the power rollers are improved in reliability. In addition, the traction surfaces of the input and output disks and the power rollers can be improved in anti-fatigue strength.

In the toroidal continuously variable transmission, the grain size of the surface is 8 or more and the grain size of the core portion is 4 or more.

Furthermore, the toroidal continuously variable transmission is formed of steel containing 0.010 to 0.050% of Al and 0.005 to 0.030% of N.

Now, the reasons will be described below.

If the input disk, output disk and the outer and inner rings of the power roller bearing, especially, the inner ring, are subjected to carburization processing or carbonitriding processing followed by polishing so as to fall the depths of the effective hardened layers of the input and output disks and power roller within 2.0 mm or more and 4.0 mm or less, the traction surfaces of the input disk, output disk and power roller are prevented from peeling off and improved in anti-fatigue cracking life.

Conventionally, the depth of the effective hardened layer has been defined as the depth of the hardened layer of Hv 550 or more from the surface as is defined in JIS G 0557. The depth is sufficient as resistance for a conventional toroidal continuously variable transmission, however not sufficient as resistance for a toroidal continuously variable transmission to be miniaturized with a higher output transmission torque. Therefore, the effective depth is defined as the depth of the hardended layer of Hv 653 or more from the surface. As a result, the traction surfaces of the input disk, output disk and power roller can be improved in life against peeling and cracking. When the toroidal continuously variable transmission is driven, cracks are produced under the traction surfaces of the input disk, output disk, and inner ring of the power roller bearing. This is because the hardness of the hardened layer becomes lower than 6 τst (i.e., 6 τst>hardness (Hv)) where τst is a shearing stress, causing a case crash due to lack of resistance.

In addition, when the toroidal continuously variable transmission having the depth of the effective hardened layer of below 2.0 mm is driven, the traction surfaces of the input and output disks receive rolling fatigue under high pressure. As a result, the reliability against dynamic maximum shearing stress along the depth decreases, shortening the life against rolling fatigue.

On the other hand, when the depths of the effective hardened layers of the input disk, output disk and power roller exceed 4.0 mm, carburization processing reaches deeper, causing the grain boundary oxidation of the surface thereof. As a result of the grain boundary oxidation, an abnormally carburized layer, such as mill scale, increases, negatively affecting the surface of a finished product and reducing the anti fatigue strength.

The traction surface of the input and output disk and the traction surface of the power roller can be improved in rolling life and anti-fatigue cracking life if the depth (the depth from the surface of the hardened layer of Hv 653) of the effective hardened layers of the input disk, output disk and the power roller fall within the range between 2.0 mm or more and 4.0 mm or less.

The depth of the effective hardened layer (2.0 mm or more and 4.0 or less) can be obtained by applying carburization processing or carbonitriding processing to a raw material. Therefore, the depth of the effective hardened layer is limited to 2.0 mm or more and 4.0 or less by subjecting the hardened layer to carburizing processing or carbonitriding processing, followed by polishing.

Also, it is more desirable that the residual compressive stress should have a peak within 0.15 mm as measured from the surfaces of the input disk, output disk and power roller and that the residual compressive stress falls between −1300 Mpa or more and −600 Mpa. In this way, it is possible to obtain a further stable life against fatigue cracking.

The residual compressive stress can be obtained by the shot peening processing. The shot peening processing is advantageous in that the surface hardness and the residual compressive stress can be applied to a working piece. In the present invention, the tensile strength of the residual compressive stress is represented by (+), whereas the compressive strength thereof is represented by (−).

The content of carbon (base carbon) contained in the base material for the input disk, output disk, and the power roller is conventionally set at 0.35 wt % or less. It has been newly found that the fatigue cracking strength would not decrease until the content of carbon reaches 0.5 wt %. Furthermore, as the core becomes stronger, the fatigue strength improves. For the reason, it is desirable that the content of the base carbon should be from 0.3% to 0.5%.

Since Si (silicon) is an essential element as a deoxidizer when steel is manufactured, it is contained in an amount of 0.1% or more. However, even if Si is contained excessively, not only the effect of Si is saturated but also the excessive Si decreases the forgeability and grindability. For the reason, the content of Si is set at 2.0% or less.

Mn is an element serving as a deoxidizer when steel is manufactured and improves hot-workability of steel and reliable quenching characteristics. To improve the hot-workability and ensure reliable quenching characteristics, Mn is contained in an amount of 0.5% or more. However, if Mn is contained excessively, the grindability of the raw material degraded, and the raw material cannot be easily formed or shaped into a rolling member. For this reason, the upper limit of the Mn content is set at 2.0%.

Cr is an element that increases the amount of carbide or carbonitride, which is deposited in the carburization or carbonitriding processing. When Cr is added in an amount of 0.5% or more, the amount of the deposited carbide increases, increasing the hardness of the outermost layer. As a result, the life against rolling fatigue further improves under the environment contaminated with foreign matter. However, if Cr is added excessively, the workability decreases. For this reason, the upper limit of the Cr content is set at 2.0%.

Mo is effective in improving quenching characteristics and contributes improvement of resistance against softening since a carbonitride is produced. The effect of Mo is not sufficient if the amount of Mo is less than 0.10%. However if the addition amount of Mo exceeds 1.5%, the workability decreases.

P (phosphorus) and S (sulfur) are impurities and inevitably present. If the contents of P and S are 0.003% or more, fatigue strength decreases. For this reason, the upper limit of P and S are set at 0.030%.

Furthermore, it is known that the purity of steel (raw material) has a strong effect upon improvement of the fatigue strength of high-strength steel against rotating and bending motions. To explain more specifically, if a large nonmetallic intervening object is present in steel, fatigue cracking and peeling-off are likely to occur stemmed from the intervening object. For this reason, it is preferable that the purity of a raw material is improved, and more preferable that the oxygen concentration of the raw material is set at 10 ppm or less.

When carburization or carbonitriding processing is performed at a high temperature of 900° C. or more for a long time, the growth of an austenite crystal grain occur. Since a crystal grain is grown coarsely, fatigue strength and impact strength decrease. To prevent the decrease in strength, the crystal grains of the contact surface of the disk and the power roller are grown in small sizes. This is because the smaller the grains, the strength becomes better. In particular, since cracks are not likely to occur when the grain size becomes 8 or more defined by JIS G0551, rolling and peeling-off resistant lives of the contact surface can be improved.

Since carburization or carbonitriding processing is applied to the disks and the power rollers, a large amount of carbide and carbonitride are deposited in the carburization layer. These deposited carbide and carbonitride prevent the growth of crystal grains. As a result, the grain size can be set at 8 or more.

In contrast, also in the core portions of the disks and power roller (which means the core portions having no effect of carburization or carbonitriding processing), the grain size is smaller, the better. This is because the strength increases. In other words, when the grain size is small, development of a crack is suppressed. As a result, the lives of the disks and power roller bearing (particularly inner ring) against cracking become long. Incidentally, in the core portion, the carbon concentration ranges from 0.3 to 0.5% and the deposition amounts of carbide and carbonitride are not so large as in the surface. As a result, a crystal grain grows into a large crystal grain.

However, it has been newly found that if a grain size is 4 or more, the growth rate of a crack at the core portion decreases. Therefore, if the grain size of the core portion is 4 or more, the lives against cracking of disks and power rollers can be improved.

Furthermore, when the input disk, output disk and the inner ring of the power roller bearing are manufactured by using steel containing Al in an amount of 0.010% or more and N in an amount of 0.005% or more, the growth of crystal grains is prevented, making it easier to attain a grain size of 8 or more in the surface and a grain size of 4 or more at the core. This is because the deposition of AlN in the steel effectively prevents the growth of a crystal grain.

If the content of Al is less than 0.010% and the content of N is less than 0.005%, the deposition amount of AlN is not sufficient. As a result, it is difficult to attain a grain size of 8 or more in the surface and a grain size of 4 or more in the core. In addition, to prevent the growing of a coarse crystal grain, it is necessary to perform carburization or carbonitriding process at a slightly lower temperature of 900 to 920° C. Such a case is not preferable since processing must be performed for a long time at a limited temperature range for increasing productivity.

AlN also serves as impurities in steel. If AlN is contained excessively, stress is applied intensively to AlN, causing rolling fatigue and fatigue cracking. As a result, lives against rolling fatigue and fatigue cracking decrease. For this reason, the amount of Al is set at 0.050% or less and the amount of N is set at 0.030 or less. On the other hand, it is preferable that Al is contained in an amount of 0.015 to 0.035% and N in an amount of 0.005 to 0.020%. This is because the grain size becomes small and AlN does not decrease the strength against fatigue.

Now, examples of the present invention will be explained. The basic structure of a toroidal continuously variable transmission according to the present invention is the same as those of conventional transmissions and any further explanation is omitted. The input disk, output disk, and power roller are the same as shown in FIG. 1 and a method of manufacturing them will be explained.

The input disk, output disk, and power roller formed of SCM 435 are subjected to heat treatment shown in FIG. 2. In FIG. 2, (a) is a carbonitriding process using an Rx gas, an enrich gas, and 5% ammonia, (b) is an oil-quenching process and (c) is an annealing process.

(Carbonitriding Condition)

Atmospheric gas: Rx gas and enrich gas+Ammonia

Carbonitriding temperature: any temperature within 900 to 960° C. (930° C. in this embodiment)

Carbonitriding time: set depending upon the depth and hardness of an effective hardened layer within 10–50 hours After completion of the carbonitriding process, the resultant construct was once cooled gradually (while placed in a furnace) and again raised in temperature to 840° C. and maintained at 840° C. Subsequently, oil-quenching was performed and subsequently annealing was performed at 180° C. for 2 hours, followed by cooling gradually.

By employing the aforementioned conditions, the surface having about Hv697–Hv772 (HRC60–HRC63) in terms of Vickers hardness is obtained. The traction surfaces of the input disk, output disk, and power roller were subjected to grinding (polishing followed by grinding). In this way, the input disk, output disk and power roller having an effective hardened layer with a depth shown in Table 1 were obtained (examples 1 to 3). Furthermore, input disks, output disks and power rollers shown in Table 1 were manufactured by varying carbonitriding conditions. Subsequently, a toroidal continuously variable transmission was manufactured and a life test was performed under the following conditions 1.

| Test conditions 1 | |
| --- | --- |
| Rotation speed of an input shaft | 4000 min$^{-1}$ |
| Input torque | 480 Nm |
| Oil to be used | Synthetic lubricating oil |
| Temperature of supplied oil | 130° C. |

The lives of the input disk, output disk and power roller was determined as time until the peeling-off of the traction surface occurred or time until any one of the input disk, output disk and power roller caused fatigue cracking.

TABLE 1

| | Hardness of effective hardening layer hardness at 2.0 mm | Hardness of effective hardening layer hardness at 3.0 mm | Hardness of effective hardening layer hardness at 4.0 mm | Life (time) | Defaults | Depth (mm) |
| --- | --- | --- | --- | --- | --- | --- |
| Example 1 | Hv653 | Hv612 | Hv570 | 200 or more | None | 2.0 |
| Example 2 | Hv680 | Hv653 | Hv608 | 200 or more | None | 3.0 |
| Example 3 | Hv692 | Hv680 | Hv653 | 200 or more | None | 4.0 |
| Comparative Example 1 | Hv630 | Hv598 | Hv550 | 31 | Breakage of distraction surface | Less than 2.0 |
| Comparative Example 2 | Hv630 | Hv598 | Hv550 | 58 | Cracking of power roller | Less than 2.0 |
| Comparative | Hv699 | Hv682 | Hv662 | 43 | Disk is cracked | Greater than 4.0 |

TABLE 1-continued

|  | Hardness of effective hardening layer hardness at 2.0 mm | Hardness of effective hardening layer hardness at 3.0 mm | Hardness of effective hardening layer hardness at 4.0 mm | Life (time) | Defaults | Depth (mm) |
|---|---|---|---|---|---|---|
| Example 3 Comparative Example 4 | Hv699 | Hv682 | Hv662 | 61 | from mill scale Power roller is cracked from mill scale | Greater than 4.0 |

As is apparent from Table 1, no peeling-off of the traction surface is observed in the input disk, output disk, and power roller (in Examples 1 to 3) having an effective hardened layer of 2.0 to 4.0 mm in depth (which is the depth from the surface of the hardened layer of Hv 653 or more) and no fatigue cracking is observed in the input disk, output disk and power roller. These facts demonstrate that the life is extremely improved.

On the other hand, as is apparent from Comparative Example 1, breakage of the distraction surface occurs in a short time. It is found from the examination of the cracked surface that the breakage is produced by case crash. More specifically, this is because shearing stress distribution τst is higher than hardness distribution.

Similarly in Comparative Example 2, cracks of a power roller are also produced by the case crush. As the cause, it is considered that the shearing stress τst is higher than the hardness distribution.

Furthermore, in Comparison Examples 3 and 4, cracks are developed from mill scale. Such cracks are produced by defects due to abnormal growth of a grain-boundary oxidation layer.

The input disk, output disk, and power roller formed of SCM 435 were subjected to the heat treatment as shown in FIG. 3. In FIG. 3, (a) is a carbonitriding process using an Rx gas, an enrich gas, and 5% ammonia, (b) is an oil-quenching process and (c) is an annealing process. The heat treatment temperature and time were adjusted so as to obtain an effective hardened layer of 3.0 mm in depth (which is the depth of the hardened layer having Hv 653 or more from the surface). A toroidal continuously variable transmission was manufactured and life test was performed under test conditions 1 mentioned above.

Figure 4:
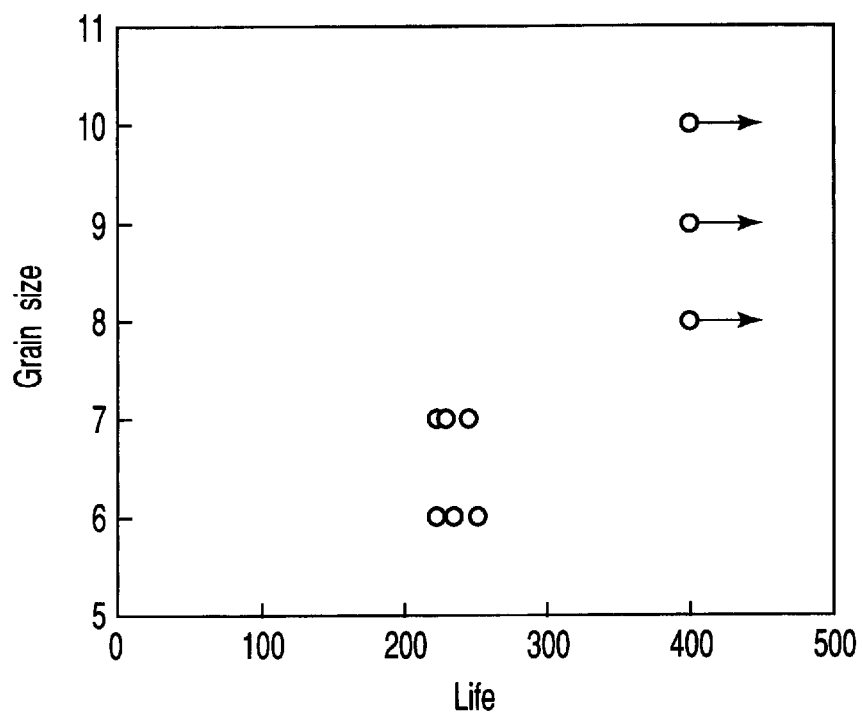
FIG. 4 is a characteristic graph showing the relationship between the size of crystal grains and life of a disk traction surface depending upon heat treatment conditions of FIG. 3.

The breakage of the input disk observed in each of examples was peel-off of the traction surface. After completion of test, the micrographic metallography of the traction surface of the input disk was observed to obtain the relationship between life of the input disk and various grain sizes. FIG. 4 shows the relationship between grain size of the traction surface of the input disk breakage and the life. FIG. 4 shows that rolling life improves when the surface grain size becomes 8 or more.

Figure 5:
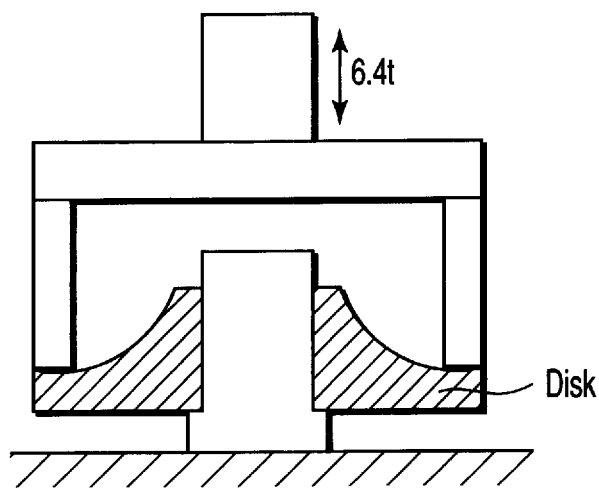
FIG. 5 is an explanatory view of a servo-type fatigue test machine.

Test was performed until the disk is broken by repeatedly applying a load (as shown in FIG. 5) to two end points of disk orbital plane manufactured in the same conditions as mentioned above. The test conditions 2 are shown below.

Test Conditions 2

| Test conditions 2 | |
|---|---|
| Test machine | Servo type fatigue test machine |
| Control | Controlled by load |
| Load | At most 6.4 t |
| Repeat speed | 20 Hz |

Figure 6:
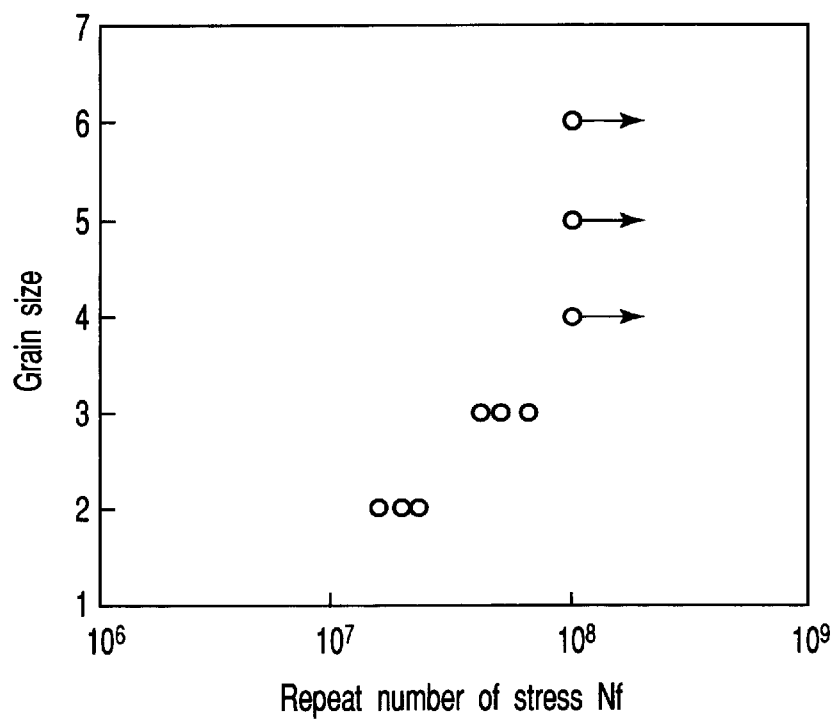
FIG. 6 is a characteristic graph showing the relationship between the grain size of an input disk core portion and the repeat number of stress.

FIG. 6 shows cracking test results of a disk (not only input disk but also output disk). Cracks were produced in the inner surface of a hole formed on the top at a height within ⅓ from the top. In FIG. 6, the horizontal axis indicates the repeating number (Nf) of application of stress and the vertical axis shows the grain size of the core portion. The results show that when the grain size of the core portion is 4 or more, the strength against fatigue cracking is improved, resulting in a long life.

From the foregoing, to improve the life against rolling fatigue, the grain size of the surface portion needs to be 8 or more. To improve the life against fatigue cracking, the grain size of the core portion needs to be 4 or more.

Therefore, for a toroidal continuously variable transmission to have satisfactory lives against rolling fatigue and fatigue cracking, it is better to set the grain size of the surface portion at 8 or more and the grain size of the core portion 21 at 4 or more.

Figure 7:
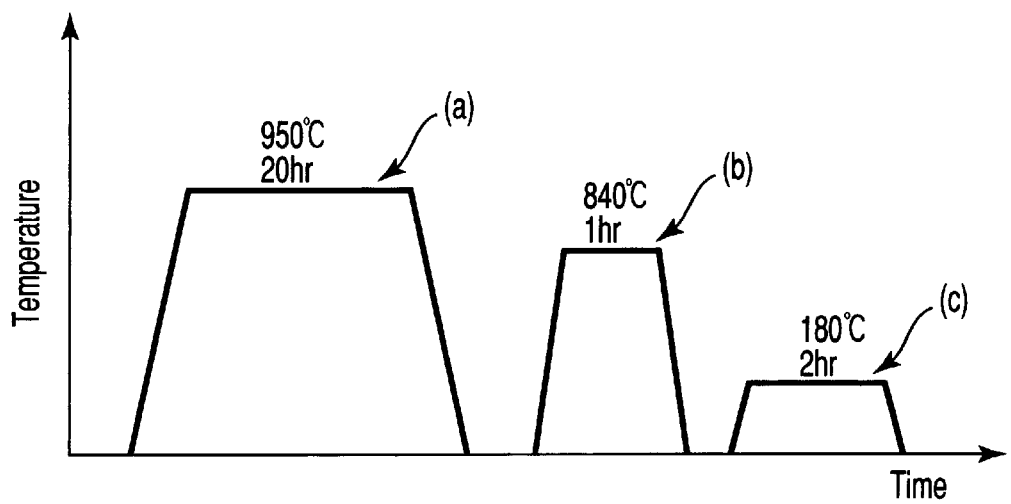
FIG. 7 is a characteristic graph showing the relationship between time and temperature when heat treatment is applied to structural components, namely an input disk, output disk, and power rollers of the toroidal continuously variable transmission of the present invention.

Next, input disks were formed of SCM 435 by varying Al and N contained therein and subjected to the heat treatment shown in FIG. 7. In FIG. 7, (a) is a carbonitriding step using Rx gas, enrich gas and 5% ammonia, (b) is an oil-quenching step, (c) is an annealing step. When the micrographic metallography was observed after grinding, the grain sizes of the surface portion and the core portion were obtained. Table 2 below shows the relationship between the amounts of Al and N, the surface grain size and the core grain size.

TABLE 2

|  | Al (%) | N (%) | Surface grain size | Core grain size |
|---|---|---|---|---|
| Example 4 | 0.010 | 0.010 | 8 | 4 |
| Example 5 | 0.015 | 0.005 | 9 | 5 |
| Example 6 | 0.020 | 0.010 | 10 | 6 |
| Example 7 | 0.035 | 0.020 | 9 | 5 |
| Example 8 | 0.015 | 0.005 | 8 | 5 |
| Example 9 | 0.020 | 0.030 | 9 | 4 |
| Example 10 | 0.050 | 0.025 | 9 | 6 |
| Comparative Example 5 | 0.005 | 0.020 | 8 | 3 |
| Comparative Example 6 | 0.020 | 0.003 | 6 | 4 |

When steel containing 0.015 to 0.035% of Al and 0.005 to 0.020% of N is subjected to the carbonitriding, quenching and annealing process, the grain size of the surface portion is obtained at 8 or more and the grain size of the core portion is obtained at 4 or more. As a result, it is possible to manufacture a toroidal continuously variable transmission having sufficient lives against rolling fatigue and fatigue cracking.

As explained above, the present invention makes it possible to provide a long-life toroidal continuously variable transmission.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toroidal continuously variable transmission comprising an input disk attached to an input shaft, an output disk attached to an output shaft, and a power roller bearing including an inner ring, an outer ring, and a plurality of rolling elements, said inner ring engaging with said input and output disks to transmit power from said input shaft to said output shaft;

wherein at least one of said input disk, output disk, and an inner ring of a power roller bearing is formed of an alloy steel and subjected to either carburizing processing and grinding, or carbonitriding processing and grinding, wherein at least one of said input disk, output disk and inner ring of the power roller bearing has an effective hardened layer of at least Hv 653 at a depth between 2.00 mm and 4.00 mm from a surface, and wherein at least one of said input disk, output disk and inner ring of the power roller bearing has a grain size of 8 or more, as defined by Japanese Industrial Standard JIS 0551, in the surface, and a grain size of 4 or more, as defined by Japanese Industrial Standard JIS 0551, in a core.

2. A toroidal continuously variable transmission according to claim 1, wherein said alloy steel contains 0.010 to 0.050% of Al and 0.005 to 0.030% of N.

3. A toroidal continuously variable transmission according to claim 1, wherein said alloy steel contains 0.015 to 0.035% of Al and 0.005 to 0.020% of N.

* * * * *